(12) United States Patent
Candemir et al.

(10) Patent No.: US 12,419,272 B1
(45) Date of Patent: Sep. 23, 2025

(54) PET STRUCTURES WITH INTEGRATED PET TOY

(71) Applicant: Furhaven Pet Products, Inc., Bellingham, WA (US)

(72) Inventors: Merve Candemir, Bellingham, WA (US); Kelsey Kimmel, Bellingham, WA (US); Jaynie Gablehouse, Bellingham, WA (US); Eric Heilborn, Bellingham, WA (US); Claire Longcope, Bellingham, WA (US)

(73) Assignee: Furhaven Pet Products, Inc., Bellingham, WA (US)

( * ) Notice: Subject to any disclaimer, the term of this patent is extended or adjusted under 35 U.S.C. 154(b) by 163 days.

(21) Appl. No.: 18/458,126

(22) Filed: Aug. 29, 2023

(51) Int. Cl.
*A01K 1/03* (2006.01)
*A01K 1/035* (2006.01)
*A01K 15/02* (2006.01)

(52) U.S. Cl.
CPC .............. *A01K 1/033* (2013.01); *A01K 1/035* (2013.01); *A01K 15/024* (2013.01)

(58) Field of Classification Search
CPC ....... A01K 1/033; A01K 1/035; A01K 15/024
USPC ................................................. D30/118, 160
See application file for complete search history.

(56) References Cited

U.S. PATENT DOCUMENTS

| | | | |
|---|---|---|---|
| 2,888,906 A | 6/1959 | Delp | |
| 2,997,019 A | 8/1961 | Bryson | |
| 3,479,990 A | 11/1969 | Crow | |
| 3,993,027 A | 11/1976 | Mullin | |
| 4,253,423 A | 3/1981 | Kaplan | |
| 4,611,556 A | 9/1986 | Frank | |
| 4,790,265 A | 12/1988 | Manson | |
| 5,067,440 A | 11/1991 | Hatten et al. | |
| 5,577,466 A | 11/1996 | Luxford | |
| 7,770,540 B2 | 8/2010 | Halpern | |
| 7,934,470 B1 | 5/2011 | Barker | |
| 8,074,608 B1 | 12/2011 | Smith | |
| 8,327,806 B2 | 12/2012 | Haaf | |

(Continued)

OTHER PUBLICATIONS

Amazon.com; 7 Ruby Road Store; https://www.amazon.com/Ruby-Road-Mounted-Hammock-Steps/dp/B07TDP994D/ref=sr_1_1_sspa?crid=30NQLTOYAI62Q&keywords=wall+mounted+cat+hammock&qid=1705612159&sprefix=wall+mounted+cat+hammock%2Caps%2C138&sr=8-1-spons&sp_csd=d2lkZ2V0TmFtZT1zcF9hdGY&psc=1; 7 pages.

(Continued)

*Primary Examiner* — Kimberly S Berona
*Assistant Examiner* — Katherine June Walter
(74) *Attorney, Agent, or Firm* — Michael R. Schacht; Schacht Law Office, Inc.

(57) ABSTRACT

A pet structure comprising a support structure, first and second track members, a spacer, and a track ball. The support structure comprises a rod member. The first and second track members are adapted to be supported by the support structure. Each track member defines a support opening sized and dimensioned to receive the rod member and a track member slot. The spacer defines a spacer opening sized and dimensioned to receive the rod member. The rod member of the support structure extends through the support opening formed in the first and second track members and the spacer opening defined by the spacer to support the first and second track members. The track ball is supported by the track member slots defined by the first and second track members for limited movement along a track path.

18 Claims, 10 Drawing Sheets

(56) References Cited

U.S. PATENT DOCUMENTS

| | | | |
|---|---|---|---|
| 8,336,501 | B2 | 12/2012 | Haaf |
| 10,070,622 | B2 | 9/2018 | Hajalie |
| 11,344,005 | B2 | 5/2022 | Wilson |
| 11,617,347 | B2 | 4/2023 | Brackett et al. |
| 11,696,569 | B2 | 7/2023 | Tuthill et al. |
| D994,994 | S * | 8/2023 | McConnochie .......... A47D 7/04 D30/118 |
| D1,007,067 | S * | 12/2023 | Zhang ................ A01K 1/00 D30/118 |
| 12,161,087 | B2 * | 12/2024 | Wilson ................ F16M 13/02 |
| 2002/0179021 | A1 | 12/2002 | DeRaspe-Bolles et al. |
| 2003/0192486 | A1 | 10/2003 | DeRaspe-Bolles et al. |
| 2003/0221628 | A1 | 12/2003 | Leon |
| 2005/0011469 | A1 | 1/2005 | Lipscomb et al. |
| 2008/0196675 | A1 * | 8/2008 | Murrer ................ A01K 15/027 119/706 |
| 2010/0154719 | A1 | 6/2010 | Kellogg et al. |
| 2012/0090552 | A1 | 4/2012 | Haaf |
| 2012/0090553 | A1 | 4/2012 | Haaf |
| 2014/0033987 | A1 | 2/2014 | Hoffman et al. |
| 2018/0000046 | A1 | 1/2018 | Kearney |
| 2019/0246605 | A1 | 8/2019 | Chen |
| 2021/0400915 | A1 | 12/2021 | Monahan |
| 2023/0069026 | A1 | 3/2023 | Tuthill et al. |
| 2024/0292813 | A1 | 9/2024 | Farwell |
| 2024/0306605 | A1 * | 9/2024 | Salyer ................ A01K 15/025 |

OTHER PUBLICATIONS

Amazon.com; 7 Ruby Road Store; Wall Mounted Cat Scratching Post; https://www.amazon.com/Ruby-Road-Wall-Mounted-Scratching/dp/B096DJZLR2/ref=sr_1_10?crid=FR1A2RJIXM6H&keywords=wall+mounted+cat+products&qid=1705613322&sprefix=wall+mounted+cat+product%2Caps%2C142&sr=8-10; 7 pages.

Amazon.com; Fukumaru; Cat Activity Tree; https://www.amazon.com/FUKUMARU-Activity-Scratching-Mounted-Scratcher/dp/B08X255BVY/ref=sr_1_30?crid=FR1A2RJIXM6H&keywords=wall%2Bmounted%2Bcat%2Bproducts&qid=1705613322&sprefix=wall%2Bmounted%2Bcat%2Bproduct%2Caps%2C142&sr=8-30&th=1; 7 pages.

Amazon.com; Fukumaru; Cat Climbing Shelf; https://www.amazon.com/FUKUMARU-Climbing-Stairway-Scratching-Platform/dp/B08G14T8QH/ref=sr_1_29_sspa?crid=J9HIHXSO08UJ&keywords=wall%2Bmounted%2Bcorrugated%2Bcat%2Bproducts&qid=1705613447&sprefix=wall%2Bmounted%2Bcorrugated%2Bcat%2Bproducts%2Caps%2C296&sr=8-29-spons&sp_csd=d2lkZ2VOTmFtZT1zcF9tdGY&th=1; 5 pages.

Amazon.com; Fukumaru; Cat Scratching Post; https://www.amazon.com/FUKUMARU-Scratching-Mounted-Scratch-Scratcher/dp/B087JTMGKC/ref=sr_1_38?crid=FR1A2RJIXM6H&keywords=wall%2Bmounted%2Bcat%2Bproducts&qid=1705613322&sprefix=wall%2Bmounted%2Bcat%2Bproduct%2Caps%2C142&sr=8-38&th=1; 8 pages.

Amazon.com; Fukumaru; Cat Wall Furniture; https://www.amazon.com/FUKUMARU-Furniture-Climbing-Mounted-Scratching/dp/B09FS8Q7QW/ref=sr_1_28?crid=FR1A2RJIXM6H&keywords=wall%2Bmounted%2Bcat%2Bproducts&qid=1705613322&sprefix=wall%2Bmounted%2Bcat%2Bproduct%2Caps%2C142&sr=8-28&th=1; 8 pages.

Amazon.com; Liflix; L Shape Cat Scratcher; https://www.amazon.com/dp/B0C24J3VFP/; 4 pages.

Amazon.com; Maedhao Store; https://www.amazon.com/Maedhao-Natural-Sustainable-Removable-Interactive/dp/B0BSCSGPLR/ref=sr_1_4?crid=3KAWEKTZ97M4P&keywords=tracking+toy+for+cat&qid=1705612946&sprefix=tracking+toy+for+ca%2Caps%2C138&sr=8-4; 3 pages.

Amazon.com; Sliways; Cat Scratcher; https://www.amazon.com/POMOHOME-Scratcher-Scratching-Interactive-Exercise/dp/B0CCHPD7F2; 3 pages.

\* cited by examiner

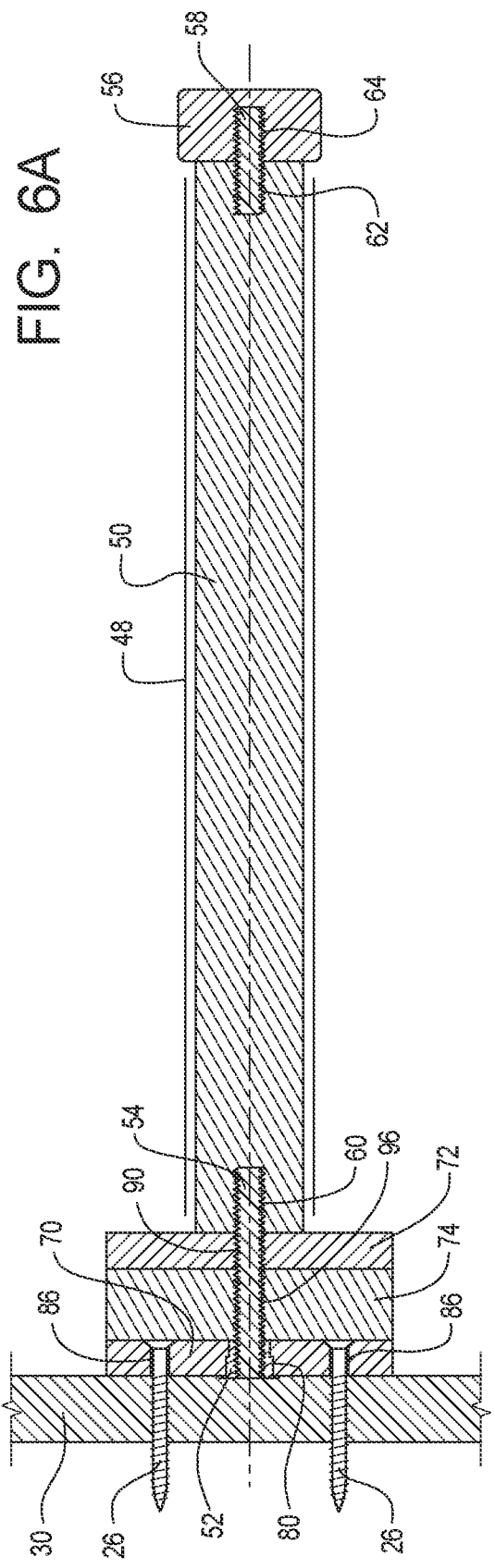
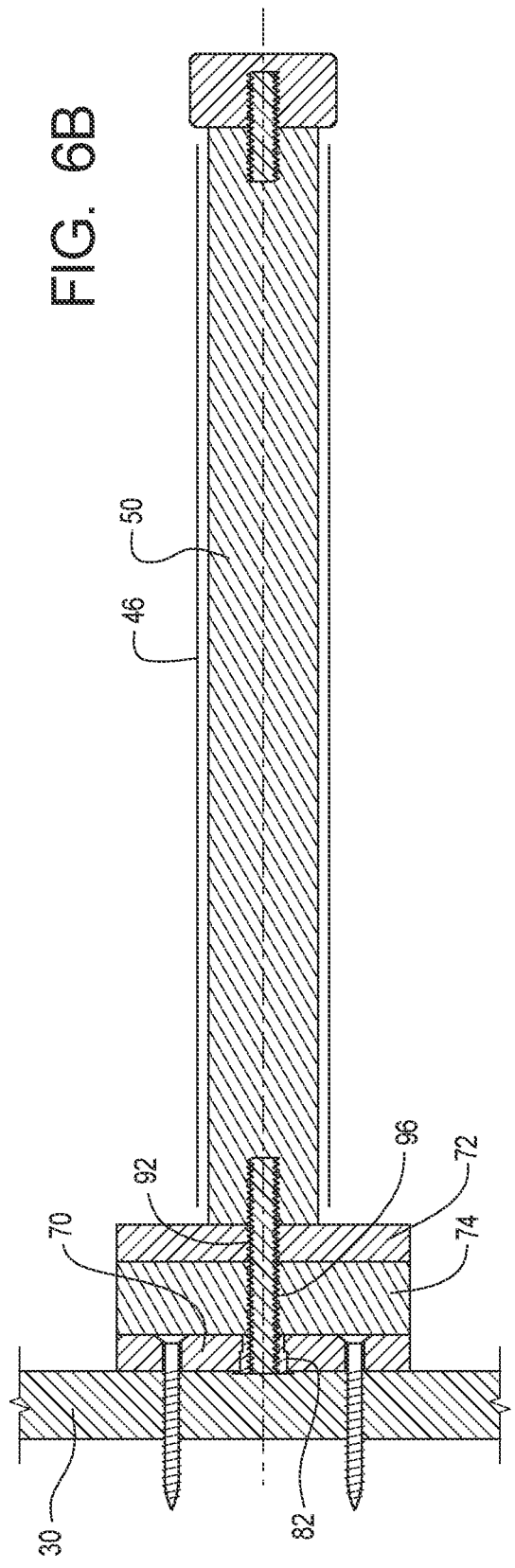

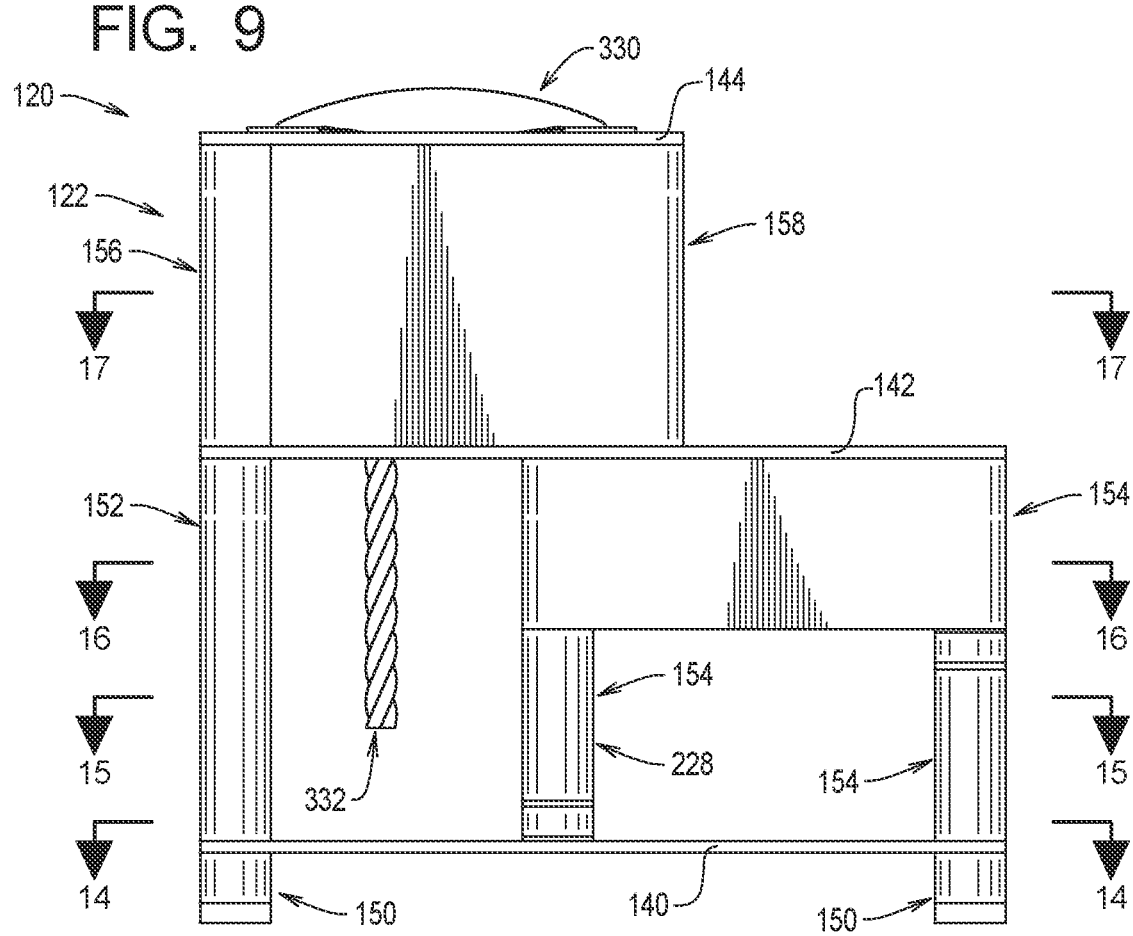
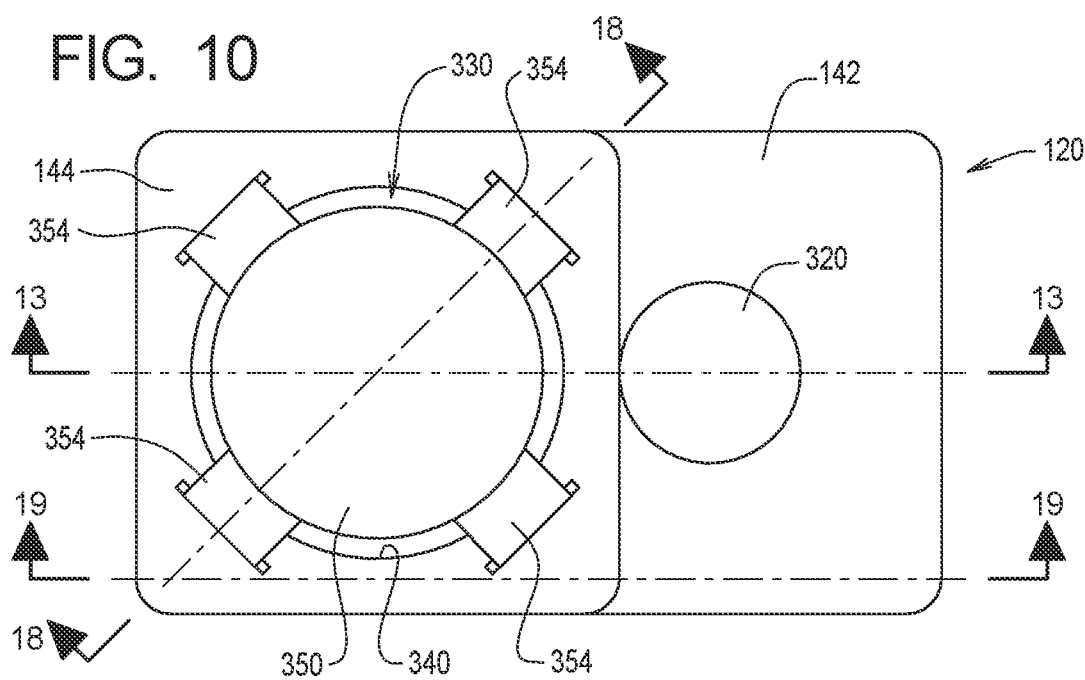

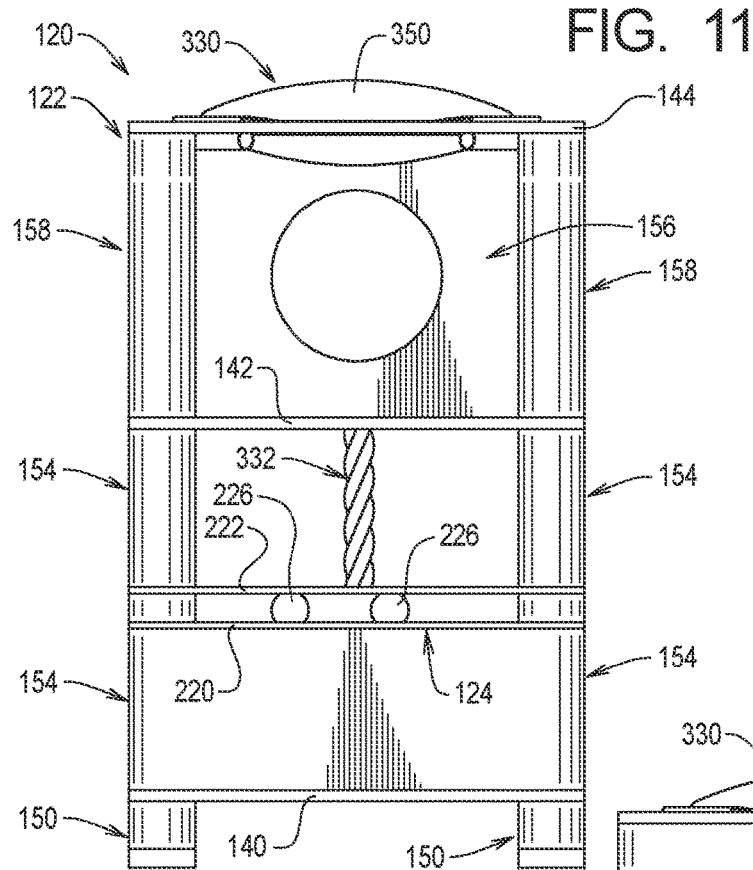
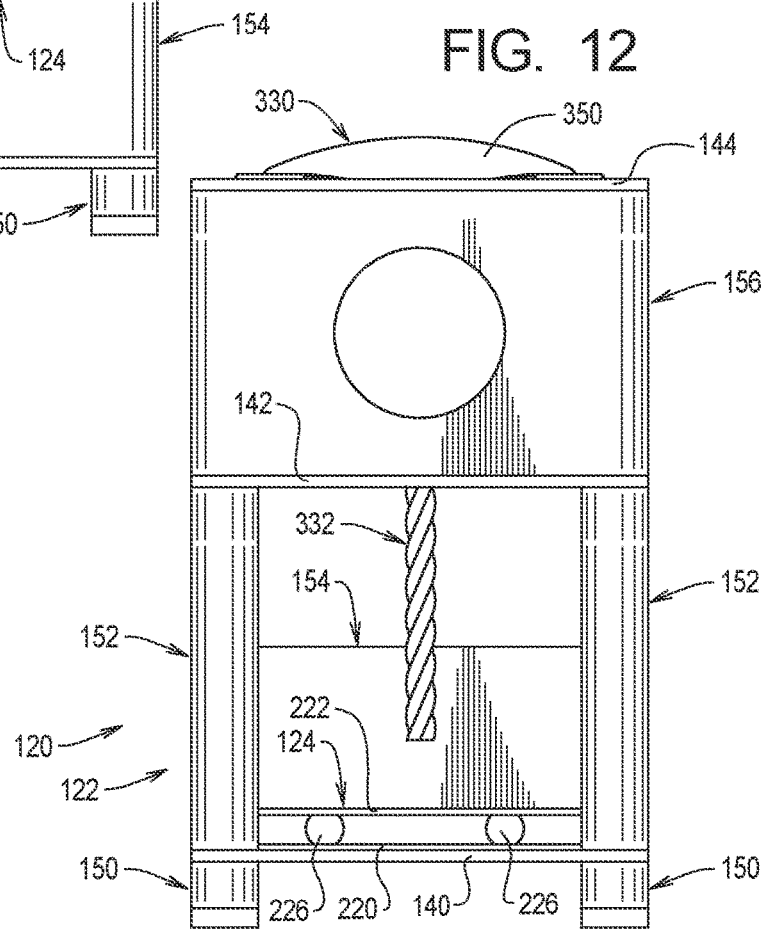

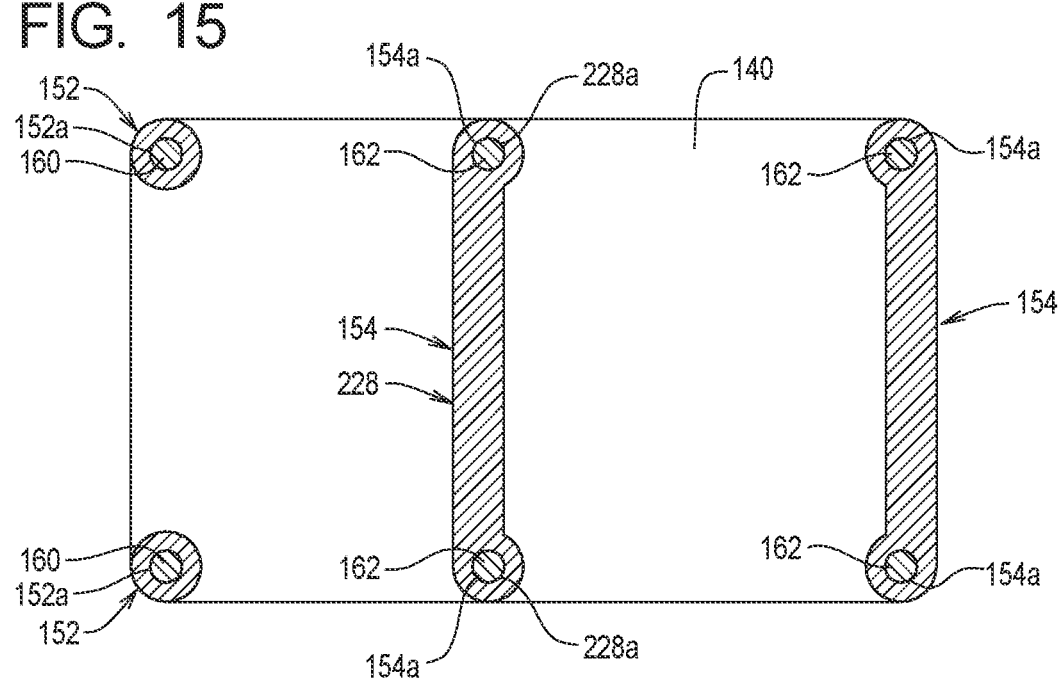
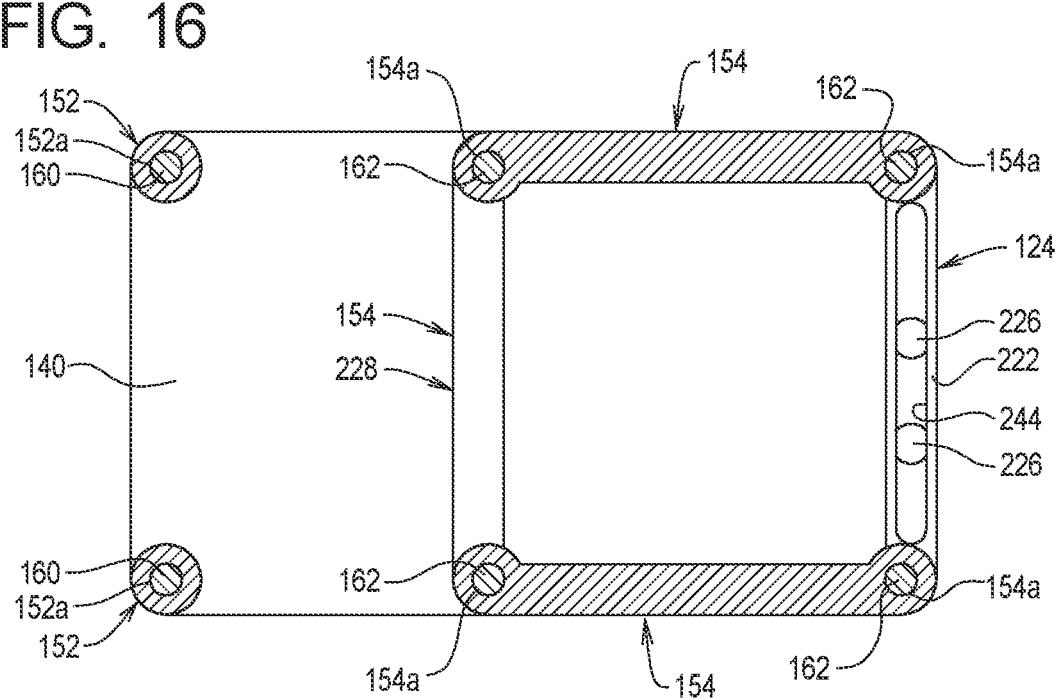

PET STRUCTURES WITH INTEGRATED PET TOY

TECHNICAL FIELD

The present invention relates to pet structures and, in particular, to pet structures that may be mounted on a surface such as a wall in a various configurations as selected by the installer.

BACKGROUND

Domestic pets are often kept within human living spaces during extended periods of time. Pet toys and structures are often arranged within such living spaces to provide activities for the pets. A pet toy can be any item that captures the attention of the pet. A pet structure is typically a free-standing device that pets may climb, scratch, and/or hide within. Pet toys and, especially, pet structures can occupy a significant portion of the surface area of the floor of human living spaces in which they are arranged.

The need thus exists for pet structure systems that can be arranged within an appropriate volume defined within a human living space. And because each living space is unique, the need further exists for pet structure systems that are adaptable to fit the needs of a particular living space.

SUMMARY

The present invention may be embodied as a pet structure comprising a support structure, first and second track members, a spacer, and a track ball. The support structure comprises at least one rod member. The first and second track members are adapted to be supported by the support structure. Each track member defines at least one support opening sized and dimensioned to receive the at least one rod member and at least one track member slot. The spacer defines a spacer opening sized and dimensioned to receive the at least one rod member. The at least one rod member of the support structure extends through the at least one support opening formed in the first and second track members and the spacer opening defined by the spacer to support the first and second track members at a desired location in space. The track ball is supported by the track member slots defined by the first and second track members for limited movement along a track path relative to the support structure.

The present invention may also be embodied as a method of forming a pet structure comprising the following steps. A support structure comprising at least one rod member is provided. First and second track members adapted to be supported by the support structure are provided. Each support structure defines at least one support opening sized and dimensioned to receive the at least one rod member and at least one track member slot. A spacer defining a spacer opening is provided. The spacer opening is sized and dimensioned to receive the at least one rod member. The at least one rod member of the support structure is arranged to extend through the at least one support opening formed in the first and second track members and the spacer opening defined by the spacer to support the first and second track members at a desired location in space. The track ball is supported by the track member slots defined by the first and second track members for limited movement along a track path relative to the support structure.

The present invention may also be embodied as a pet structure adapted to be supported by a vertical mounting surface comprising a support structure, first and second track members, a spacer, and a track ball. The support structure comprises at least one support member adapted to be secured to the vertical mounting surface and at least one rod member extending from the at least one support member. The first and second track members are adapted to be supported by the support structure, where each track member defines at least one support opening sized and dimensioned to receive the at least one rod member and at least one track member slot. The spacer defines a spacer opening sized and dimensioned to receive the at least one rod member. The at least one rod member of the support structure extends through the at least one support opening formed in the first and second track members and the spacer opening defined by the spacer to support the first and second track members at a desired location in space. The track ball is supported by the track member slots defined by the first and second track members for limited movement along a track path relative to the support structure.

The present invention may also be embodied as a pet structure adapted to be supported by a horizontal surface. In this embodiment, the pet structure comprises a support structure, first and second track members, a spacer, and a track ball. The support structure comprises at least one platform member adapted to be supported by the horizontal surface and at least one rod member extending from the at least one platform member. The first and second track members are adapted to be supported by the support structure, and each track member defines at least one support opening sized and dimensioned to receive the at least one rod member and at least one track member slot. The spacer defines a spacer opening sized and dimensioned to receive the at least one rod member. The at least one rod member of the support structure extends through the at least one support opening formed in the first and second track members and the spacer opening defined by the spacer to support the first and second track members at a desired location in space. The track ball is supported by the track member slots defined by the first and second track members for limited movement along a track path relative to the support structure.

BRIEF DESCRIPTION OF THE DRAWINGS

FIGS. 6A and 6B are section views taken along lines 6A-6A and 6B-6B, respectively, in FIG. 3;

FIG. 9 is a first side elevation view of the second example pet structure;

FIG. 10 is a top plan view of the second example pet structure;

FIG. 11 is a first end elevation view of the second example pet structure;

FIG. 12 is a second end elevation view of the second example pet structure;

FIG. 15 is a section view taken along lines 15-15 in FIG. 9;

FIG. 16 is a section view taken along lines 16-16 in FIG. 9;

DETAILED DESCRIPTION

Figure 1:
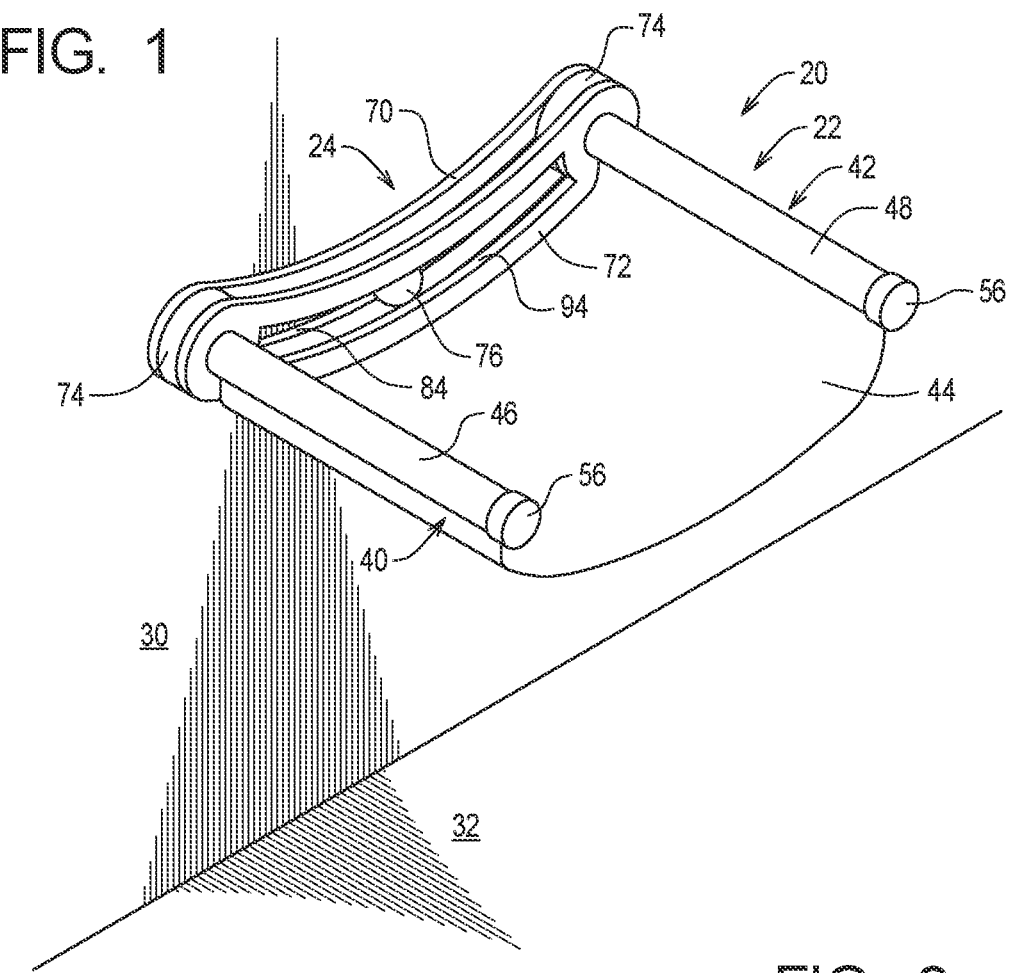
FIG. 1 is a front perspective view of a first example pet structure of the present invention.

The present invention may be embodied in different forms, and several different embodiments of the present invention will be discussed separately below.

I. First Embodiment

Referring initially to FIGS. 1-7 of the drawing, depicted therein is a first example pet structure assembly 20 constructed in accordance with, and embodying, the principles of the present invention. The first example pet structure 20 comprises a support structure 22, a track assembly 24, and one or more fasteners 26. The first example pet structure assembly 20 is adapted to be supported from a mounting structure 30. The example mounting structure 30 is a wall that supports the second example pet structure assembly at a desired height above a floor surface 32.

The example support structure 22 is adapted to support the track assembly 24 in an operational configuration. The example support structure 22 is further adapted to be connected to the mounting structure 30 by one or more of the fasteners 26 such that the example track assembly 24 is supported above the floor surface 32.

Figure 2:
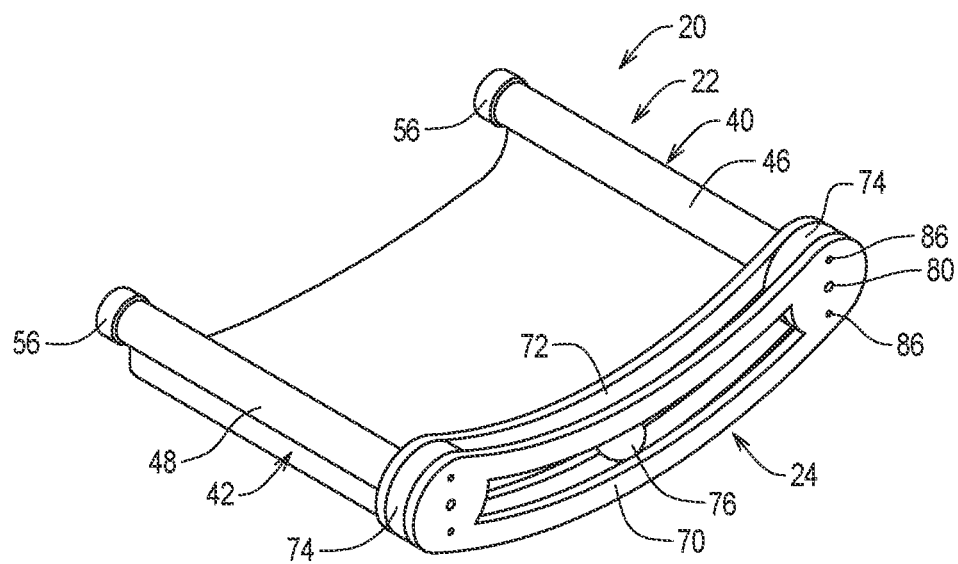
FIG. 2 is a rear perspective view of the first example pet structure of the present invention.
Figure 3:
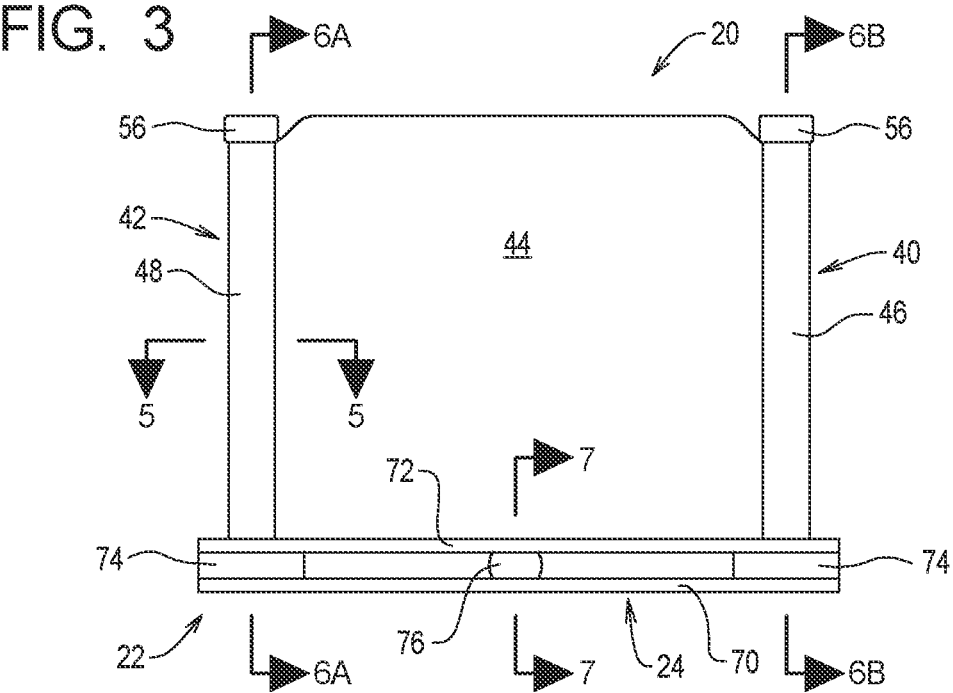
FIG. 3 is a top plan view of the first example pet structure.
Figure 4:
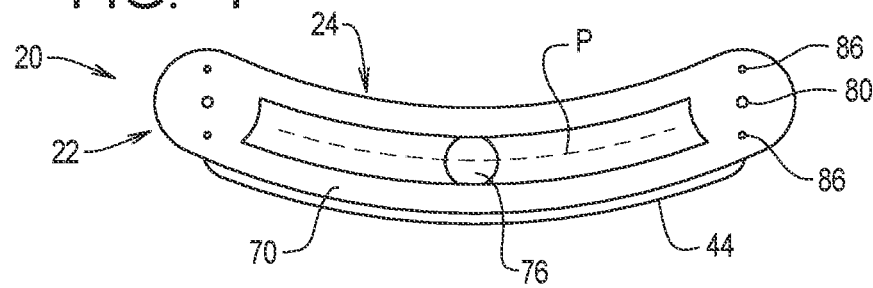
FIG. 4 is a rear elevation view of the first example pet structure of the present invention.
Figure 5:
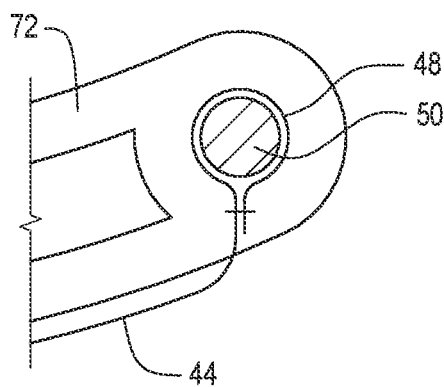
FIG. 5 is a section view taken along lines 5-5 in FIG. 3.
Figure 7:
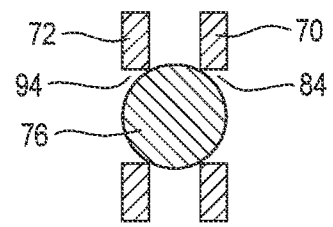
FIG. 7 is a section view taken along lines 7-7 in FIG. 3.
Figure 8:
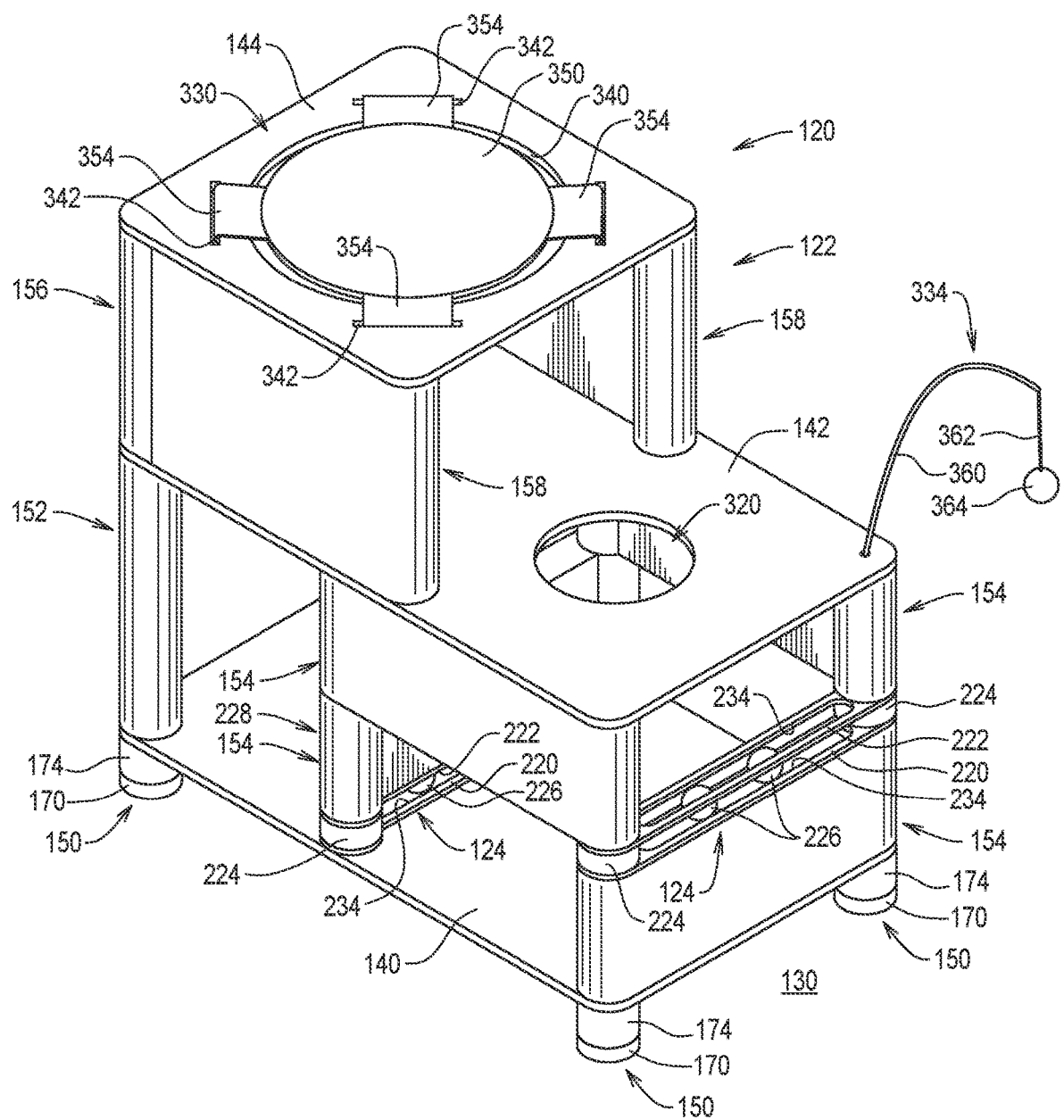
FIG. 8 is a front perspective view of a second example pet structure of the present invention.

The example support structure 22 comprises a first support assembly 40, a second support assembly 42, and a platform member 44 configured to define first and second loops 46 and 48. The example first and second support assemblies 40 and 42 are the same, and only the second example support assembly 40 will be described herein in detail. However, it is possible that the example track assembly 24 may be supported above the floor surface 32 by a single support assembly. Further, the first and second example support assemblies 40 and 42 need not be the same, and different structures may be used to form the example support structure 22. The first and second loops 46 and 48 are configured to engage the first and second support assemblies 40 and 42 such that the platform member 44 extends between the first and second support assemblies 40 and 42 as shown in FIGS. 1 and 2.

The example first support assembly 40 comprises a support member 50, an anchor member 52, an anchor connector 54, a cap member 56, and a cap connector 58. The example support member 50 defines first and second support member openings 60 and 62, and the example cap member 56 defines a cap member opening 64.

The example anchor connector 54 is adapted to be received within the first support member opening 60 and the anchor member 52 to connect the support member 50 relative to the anchor member 52. The example cap connector 58 is adapted to be received within the second support member opening 62 and the cap member opening 64 to secure the cap member 56 relative to the support member 50. The example anchor connector 54 and cap connector 58 are threaded metal rods. One end of the example anchor connector 54 adapted to be threaded into the anchor member 52, and the other end of the example anchor connector 54 is adapted to be threaded into the first support member opening 60. The ends of the example cap connector 58 are adapted to be threaded into the second support member opening 62 and the cap member opening 64. Other systems for connecting the support member 50 to the anchor member 52 and/or the cap member 56 to the support member 50, such as adhesives, detent fasteners, or the like, may be used in addition to or instead of the threaded anchor member 54 and threaded cap member 58 as described herein.

The example track assembly 24 comprises a first track member 70, a second track member 72, at least one spacer 74, and at least one track ball 76. The example main track member 70 defines a main track first member opening 80, a main track member second opening 82, a main track member slot 84, and one or more fastener openings 86. The example secondary track member 72 similarly defines a secondary track member first opening 90, a secondary track member second opening 92, and a secondary track member slot 94. The example secondary track member 72 does not, but may, include fastener openings. The example spacer 74 defines a spacer opening 96.

The second example pet structure assembly 20 is assembled as follows. Initially, the anchor members 52 are inserted at least partly into or through the first and second support openings 80 and 82 of the main track member 70. The anchor members 52 and/or the first and second support openings 80 and 82 are configured to prevent passage of the anchor members 52 through the first and second support openings 80 and 82.

The mounting fastener(s) 26 are next used to secure the main track member 70 to the mounting structure 30. The example mounting fastener(s) 26 is (are) screws adapted to extend through the fastener openings 86 in the main track member 70 and into the mounting structure 30 to secure the main track member 70 at a desired location above the floor surface 32. In the first example pet structure assembly 20, four of the mounting fasteners 26 are each inserted through one fastener opening 86 of a pair of fastener openings 86 formed in the main track member 70 adjacent to each of the first and second support openings 80 and 82 in the main track member 70.

One of the example anchor connectors 54 is threaded into each of the anchor members 52 supported by the main track member 70 such that at least a portion of each anchor connector 54 extends from the main track member 70 away from the mounting structure 30.

The spacers 74 are next arranged such that each of the anchor connectors 54 extends through the spacer opening 96 in the spacers 74. While holding one (or more) track ball 76 between the main track member 70 and the secondary track member 72, the secondary track member 72 is next arranged such that a distal portion of one of the anchor connectors 54 extends through each of the first and second support openings 90 and 92 in the secondary track member 72. The track ball 76 is supported by the edges of the main and secondary track members 70 and 72 defining the main and secondary track member slots 84 and 94.

Next, the support members 50 of the first and second support assemblies 40 and 42 are arranged such that the first support member openings 60 of the support members 50 receive the distal portions of the anchor connectors 54. In the first example pet structure assembly 20, axial rotation of the support members 50 relative to the anchor connectors 54 causes axial displacement of the support members 50 towards and against the secondary track member 72 such that the secondary track member 72 and the spacers 74 are clamped or otherwise securely held between the support members 50 and the main track member 70.

The example spacers 74 maintain the secondary track member 72 a fixed distance from, and substantially parallel to, the main track member 70 such that the track ball 76 is supported for movement within the track member slots 84 and 94 along a travel path P extending between the ends of the track member slots 84 and 94.

The example platform member 44 is arranged such that first and second loops 46 and 48 receive the support members 50 of the first and second support assemblies 40 and 42. The cap connectors 58 are arranged to engage the second support member openings 62 of the support members 50. The cap members 56 are next arranged such that the cap member openings 64 receive and engage the cap connectors 58 to secure the cap members 56 to the support members 50. The cap members 50 inhibit movement of the support loops 46 and 48 relative to the support members 50.

The first example pet structure assembly 20 provides both a pet support surface formed by the platform member 44 and a pet toy formed by movement of the trackball 76 relative to the track members 70 and 72. The first example pet structure 20 can be arranged within an appropriate volume defined within a human living space and is adaptable to fit the needs of a particular living space.

The materials used to form the platform member 44, support members 50, anchor members 52, anchor connectors 54, cap members 56, cap connectors 58, main track member 70, secondary track member 72, spacers 74, and trackball 76 are selected to perform the function of the second example pet structure 20 as described herein. The example platform member 44 is typically made of a flexible fabric material. The example support members 50, cap members 56, main track member 70, secondary track member 72, spacers 74, and trackball 76 are typically made of wood. The anchor members 52, anchor connectors 54, and cap connectors 58 are typically made of steel. Optionally, the spacers 74 may be made of stacked sheets of corrugated paper. These materials are ideally cost effective but should be non-toxic to pets and/or humans.

II. Second Embodiment

Referring now to FIGS. 8-19 of the drawing, depicted therein is a second example pet structure assembly 120 constructed in accordance with, and embodying, the principles of the present invention. The second example pet structure 120 comprises a support structure 122, and one or more track assemblies 124. The second example pet structure assembly 120 is adapted to be supported on a floor surface 130.

The example support structure 122 is adapted to support each of the one or more track assemblies 124 in an operational configuration. The example support structure 124 is further adapted to be supported relative to the floor surface such that each of the example track assemblies 124 is supported at a desired location relative the floor surface 130.

The example support structure 122 comprises a lower platform member 140, an intermediate platform member 142, an upper platform member 144. Fewer or more than three platform members can be used, but typically at least one platform member is used to form the example support structure 122.

The example support structure 122 further comprises a plurality of foot assemblies 150, one or more lower spacer assemblies 152, one or more lower wall assemblies 154, one or more first upper wall assemblies 156, and one or more second upper wall assemblies 158. The number of wall assemblies used may vary depending on the configuration of a particular pet structure assembly of the present invention.

Figure 19:
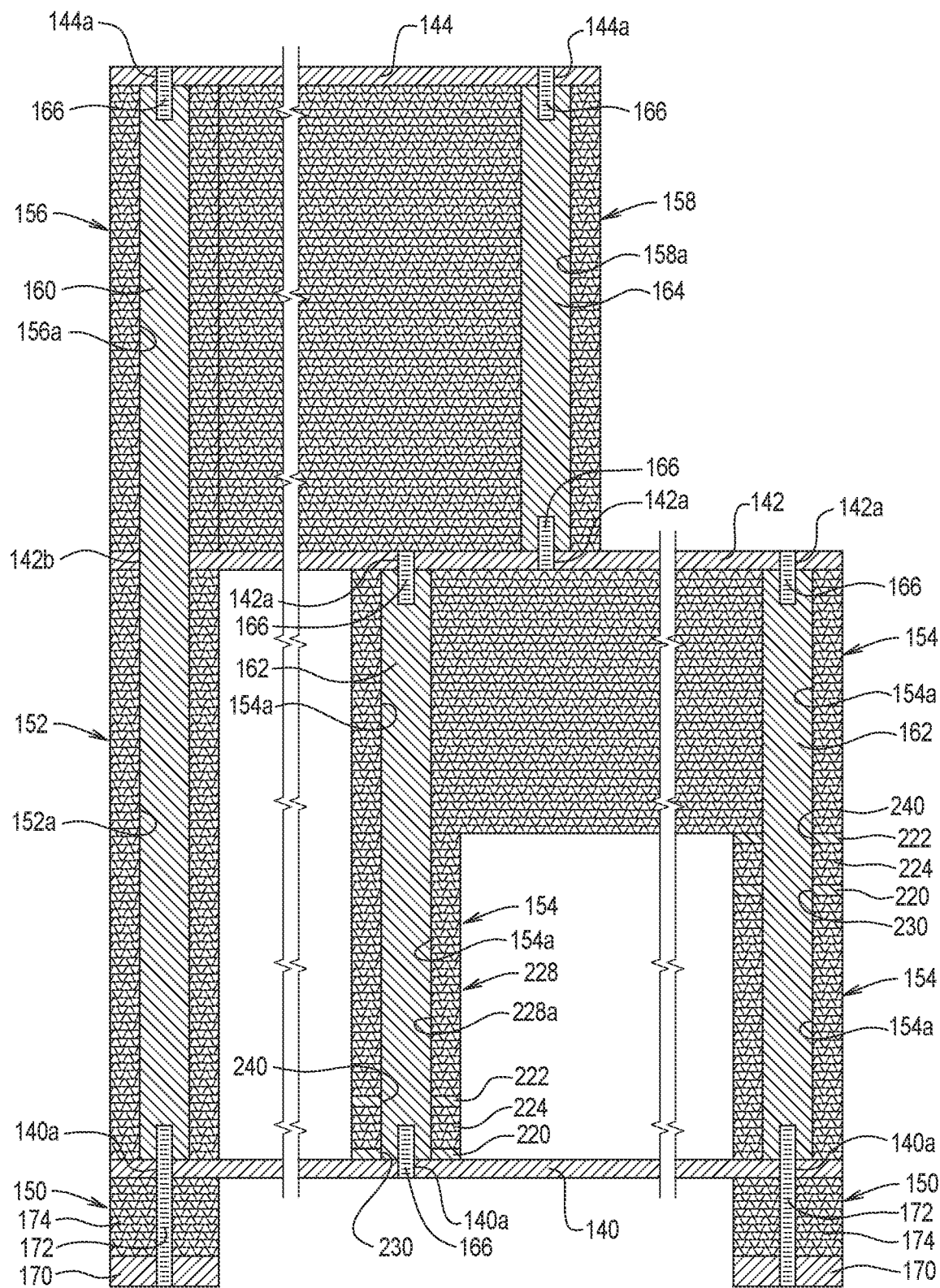
FIG. 19 is a section view taken along lines 19-19 in FIG. 10.

The example support structure assembly 122 further comprises one or more full support rods 160, one or more first partial support rods 162, and a plurality of second partial support rods 164. As best shown in FIG. 19, the example full support rods 160 extend between the lower platform member 140 and the upper platform member 144, the example first partial support rods 162 extend between the lower platform 140 and the intermediate platform 142, and the example second partial support rods extend between the intermediate platform 142 and the upper platform 144. The example support structure assembly 122 further comprises a plurality of rod connectors 166 for connecting the support rods 160, 162, and/or 164 to the appropriate platform members 140, 142, and 144.

Any material capable of supporting the second example pet structure assembly 120 during normal use can be used to form lower wall spacer assembly 152 and wall assemblies 154 and upper wall assemblies 156 and 158, but, like the example foot spacers 150, the various wall/spacer assemblies 152, 154, 156, and 158 of the example support structure assembly 122 are made of stacked sheets of corrugated paper as shown in the drawing. When stacked sheets of corrugated paper are used to form components of the support structure 122, the sheets are typically die cut in a desired profile then stacked, with or without adhesive, to form the desired component in a desired shape.

The example support rods 160, 162, and 164 may be made of any material capable of supporting the support structure assembly 122 but are desirably made of an inexpensive, non-toxic material such as wood. The example rod connectors 166 are typically made of steel and may be threaded to enhance the connection to the rods 160, 162, and/or 164.

Turning now to the section views of FIGS. 14-19, it can be seen that each of the example wall/spacer structures 152, 154, 156, and 158 defines at least one rod opening 152a, 154a, 156a, and 158a, respectively. These rod openings 152a, 154a, 156a, and 158a are sized and dimensioned to snugly receive the rods 160, 162, or 164 as perhaps best shown in FIG. 19. In addition, connector openings 140a, 142a, and 144a are formed in the example lower platform member 140, intermediate platform member 142, and upper platform member 144, respectively. These connector openings 140a, 142a, and 144a are sized and dimensioned to receive any of the rod connectors 166 as shown in FIG. 19. In addition, at least one support opening 142b is formed in the example intermediate platform member 142 to allow the example full support rod 160 to extend between the lower platform member 140 and the upper platform member 144.

Each of the example foot assemblies 150 comprises a foot member 170, a foot connector 172, and a foot spacer 174. The example foot member 170 is made of a material adapted to engage the floor surface 130 and support the second example pet structure assembly 120 without damaging the floor surface 130. Any material capable of supporting the second example pet structure assembly 120 during normal use can be used to form the example foot spacers 174, but the example foot spacers 174 are made of stacked sheets of corrugated paper as shown in the drawing. The sheets of corrugated paper forming the example foot spacers 174 are circular, yielding cylindrical foots pacers 174. The example foot connectors 172 are typically made of steel and may be threaded to enhance the connection to the rods 160, 162, and/or 164. The example connector openings 140*a* are sized and dimensioned to receive any of the foot connectors 172 as shown in FIG. 19.

Figure 17:
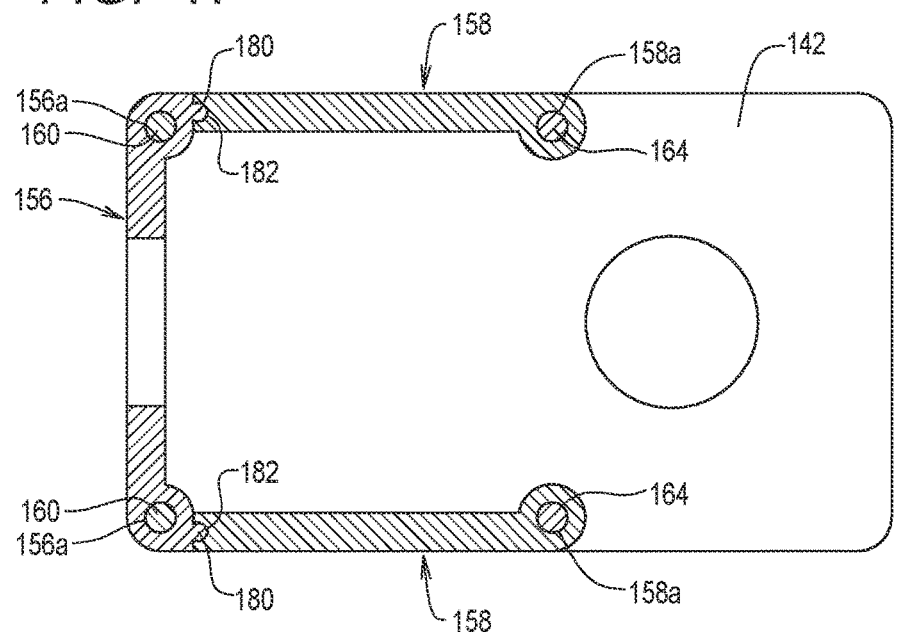
FIG. 17 is a section view taken along lines 17-17 in FIG. 9.
Figure 18:
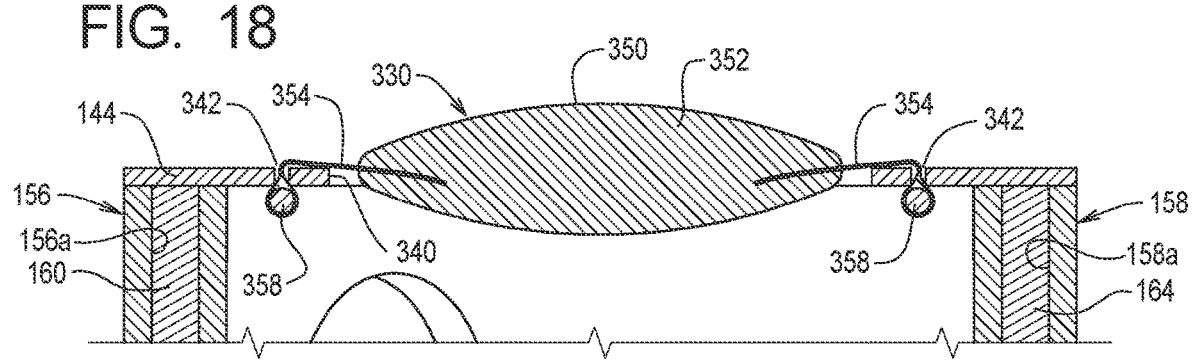
FIG. 18 is a section view taken along lines 18-18 in FIG. 10.

Turning now to FIG. 17 of the drawing, it can be seen that the example first upper wall assembly 156 defines an upper wall projection 180 and that the example second upper wall assembly 158 defines an upper wall recess 182. The example wall recess 182 receives the example upper wall projection 180 to lock one edge of the first upper wall assembly 156 relative to a corresponding edge of one of the second upper wall assemblies 158. In the example shown in FIG. 17, the first upper wall assembly 156 defines two of the upper wall projections 180, with each of the upper wall projections 180 arranged to be received by one upper wall recess 182 formed in each of two second upper wall assemblies 158.

In use, the example support structure is formed by inserting the rods through appropriate wall openings and then securing the rods to the foot assemblies and/or to the platform members. The configuration of a support structure of the present invention can be altered by the pet structure designer or possibly by the pet structure assembler. As a simple example, a two-tiered structure may be fabricated by eliminating all components above the intermediate platform member and replacing the full support rods with first partial support rods. The exact configuration of the support structure 122 is thus not critical so long as certain minimum combinations of the various components described herein are used.

Turning now to FIGS. 13, 14, 16, and 19, the construction and use of the example track assemblies 124 of the second example pet structure assembly 120 will now be described in further detail. Each of the example track assemblies 124 of the second example pet structure assembly 120 are the same, so the same reference characters will be used to refer to both of the depicted track assemblies 124.

Each track assembly 124 comprises a base track member 220, a secondary track member 222, a track spacer 224, a track ball 226, and a platform spacer 228. The example base track member 220 defines a first support opening 230, a second support opening (not shown), and a base track member slot 234. The example secondary track member 222 defines a first support opening 240, a second support opening (not shown), and a secondary track member slot 244.

The base and secondary track members 220 and 222 are sized and dimensioned such that the first track openings 230 and 240 are spaced from the second track openings (not shown) to receive one of the support rods 160, 162, or 164 forming the example support structure assembly 122. In use, one of the track spacers 224 is arranged between the base and secondary track members 220 and 222 to maintain a minimum distance between the track members 220 and 222. The example track spacers 224 define track member openings 224*a* that are sized and dimensioned to receive the support rods 160, 162, and 164 to secure the track spacers 224 relative to the track members 220 and 222 during use of the second example pet structure 120.

The example track ball(s) 226 is (are) arranged between the base and secondary track members 220 and 222 such that at least a portion of the ball(s) 226 resides within the base and secondary track member slots 234 and 244. However, the track spacer(s) 224 maintain a distance between the base and secondary track members 234 and 244 that allows the track ball(s) 226 to move along a track path defined by the track member slots 234 and 244. During normal use, the track ball(s) 226 are movable relative to the support structure 122 but cannot be separated from the support structure 122. A pet using the second example pet structure assembly 120 can move the ball(s) 226 for amusement but cannot remove and possibly lose the ball(s) 226.

The example platform spacer wall 228 defines platform spacer openings 228*a* that are sized and dimensioned to receive the support rod 162 to space the track members 220 and 222 relative to the platform members 140, 142, and/or 144 during normal use of the second example pet structure 120. The example platform spacer wall 228 is, like the foot spacers 174 described above, made of any structural material suitable for use as part of a pet structure but are, in the second example pet structure assembly 120, made of stacked layers of corrugated sheets of paper.

Turning now back to FIG. 1 of the drawing, it can be seen that the intermediate platform 142 defines an intermediate platform opening 320 sized and dimensioned to allow a user pet to climb from the lower platform 140 to the intermediate platform 142. FIGS. 8-13, and 18 further show that a hammock assembly 330, rope assembly 332, and suspended ball assembly 334 may be supported by the upper platform member 144 and intermediate platform member 142.

In particular, the example hammock assembly 330 is supported within a hammock opening 340 formed in the upper platform member 144 Strap openings 342 in the upper platform member 144 are configured to support the hammock assembly 330. The hammock assembly 330 comprises a hammock case 350, hammock filling 352 within the hammock case 350, and one or more hammock straps 354 secured to the hammock case 350. The hammock strap(s) 354 radially extend from the hammock case and through the strap openings 342 to suspend the hammock case 350 and filling 352 in a desired position relative to the hammock opening 340. Strap bars 358 engage the hammock straps 354 to prevent the hammock straps 354 from being withdrawn through the strap openings 342 during normal use of the hammock assembly 330.

The example rope assembly 332 is a short length of rope suspended from the intermediate platform member 142 to a space between the lower and intermediate platform members 140 and 142.

The example suspended toy assembly 334 comprises a toy pole 360, a toy line 362, and a suspended toy 364. The toy pole 360 is supported by the intermediate platform member 142, the toy line 362 is attached to an end of the toy pole 360 distal from the intermediate platform member 142, and the suspended toy 364 is attached to an end of the toy line 362 distal from the toy pole 360.

Figure 13:
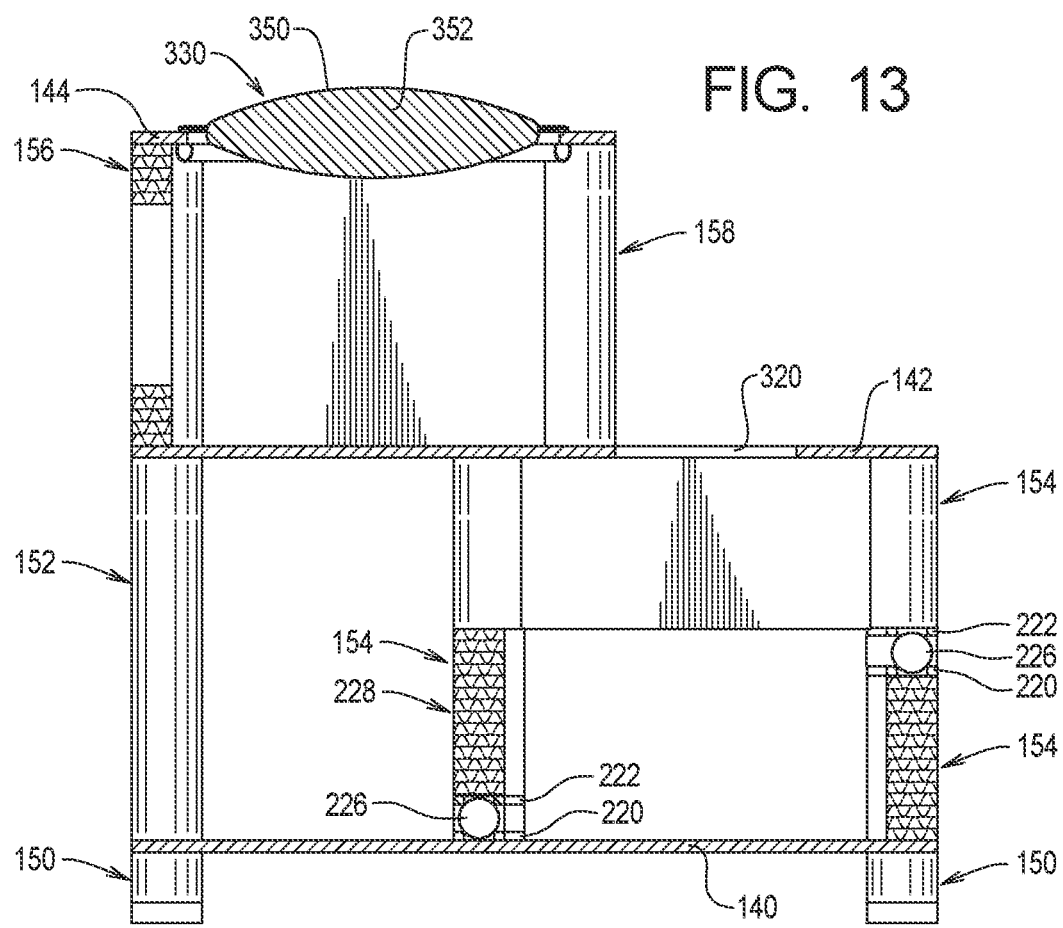
FIG. 13 is a section view taken along lines 13-13 in FIG. 10.
Figure 14:
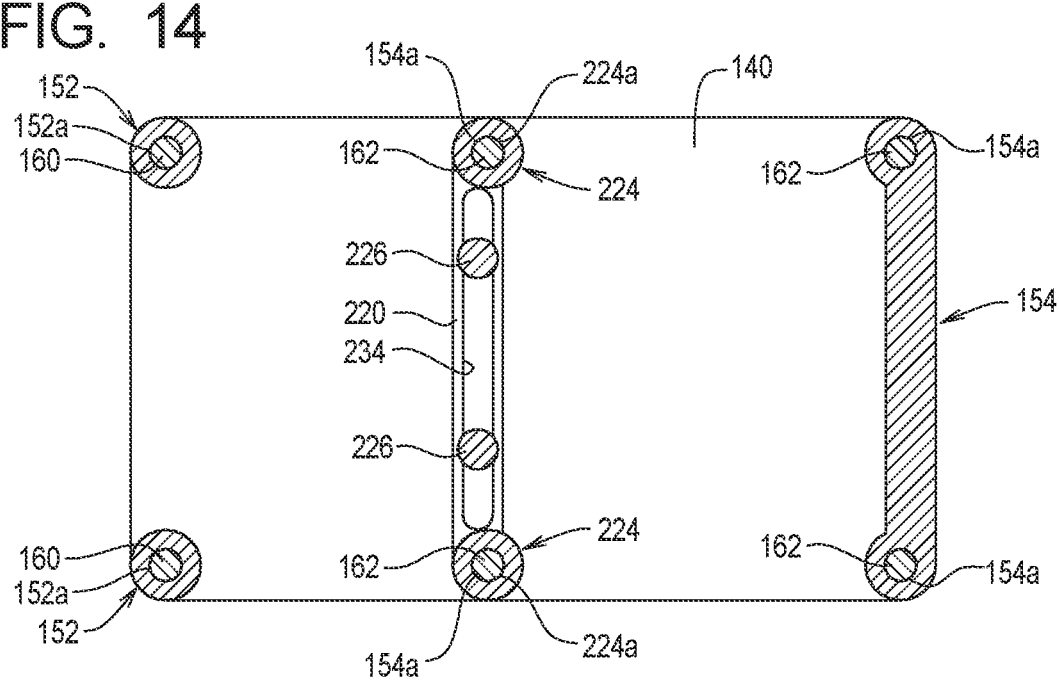
FIG. 14 is a section view taken along lines 14-14 in FIG. 9.

FIGS. 11-13 illustrate an entry hole formed in the first upper wall assembly 156.

The second example pet structure assembly 120 provides one or more pet toys formed by movement of the trackball(s) 226 relative to the track members 220 and 222 as well as numerous other features designed to amuse and/or comfort a pet. The second example pet structure 120 can be arranged within an appropriate volume defined within a human living space and is adaptable to fit the needs of a particular living space. And the construction of the support structure 122 allows numerous configurations that allow the designer to develop multiple configurations of pet structure assemblies with a limited palette of components.

What is claimed is:
1. A pet structure comprising:
   a support structure comprising at least one rod member;
   first and second track members adapted to be supported by the support structure, where each of the first and second track members defines
      at least one support opening sized and dimensioned to receive the at least one rod member, and at least one track member slot;
a spacer defining a spacer opening sized and dimensioned to receive the at least one rod member; and
a track ball; wherein
the at least one rod member of the support structure extends through the at least one support opening formed in the first and second track members and the spacer opening defined by the spacer to support the first and second track members at a desired location in space; and
the track ball is supported by the track member slots defined by the first and second track members for limited movement along a track path relative to the support structure.

2. A pet structure as recited in claim 1, in which the support structure is adapted to be supported from a vertical mounting surface.

3. A pet structure as recited in claim 2, in which the support structure comprises:
a support member; and
an anchor connector; wherein
the support member is adapted to be secured to the vertical mounting surface;
the anchor connector is adapted to be secured relative to the support member and relative to the at least one rod member.

4. A pet structure as recited in claim 3, further comprising an anchor member, where the anchor connector engages the anchor member to secure the anchor connector relative to the support member.

5. A pet structure as recited in claim 2, in which the support structure comprises;
a support member;
a plurality of anchor connectors; and
a plurality of the rod members; wherein
the support member is adapted to be secured to the vertical mounting surface; and
each anchor connector is adapted to be secured relative to the support member and to one of the plurality of rod members.

6. A pet structure as recited in claim 2, in which:
each of the first and second track members defines first and second support openings; and
the support structure comprises;
a support member;
first and second anchor connectors; and
first and second rod members; wherein
the support member is adapted to be secured to the vertical mounting surface;
the first rod member is extended through the first support openings of the first and second track members;
the second rod member is extended through the second support openings of the first and second track members;
the first anchor member is adapted to be secured relative to the support member and to the first rod member; and
the second anchor member is adapted to be secured relative to the support member and to the second rod member.

7. A pet structure as recited in claim 1, in which the support structure is adapted to be supported on a horizontal surface.

8. A pet structure as recited in claim 7, in which the support structure comprises:
a plurality of platform members; and
at least one wall assembly adapted to be arranged between adjacent platform members, where each wall assembly defines a wall support opening sized and dimensioned to receive one of the plurality of rod members.

9. A pet structure as recited in claim 8, further comprising at least one spacer assembly adapted to be arranged between adjacent platform members, where each spacer assembly defines a spacer support opening sized and dimensioned to receive one of the plurality of rod members.

10. A method of forming a pet structure comprising the steps of:
providing a support structure comprising at least one rod member;
providing first and second track members adapted to be supported by the support structure, where each of the first and second track members defines
at least one support opening sized and dimensioned to receive the at least one rod member, and
at least one track member slot;
providing a spacer defining a spacer opening sized and dimensioned to receive the at least one rod member; and
arranging the at least one rod member of the support structure to extend through the at least one support opening formed in the first and second track members and the spacer opening defined by the spacer to support the first and second track members at a desired location in space; and
supporting a track ball by the track member slots defined by the first and second track members for limited movement along a track path relative to the support structure.

11. A pet structure adapted to be supported by a vertical mounting surface, the pet structure comprising:
a support structure comprising
at least one support member adapted to be secured to the vertical mounting surface, and
at least one rod member extending from the at least one support member;
first and second track members adapted to be supported by the support structure, where each of the first and second track members defines
at least one support opening sized and dimensioned to receive the at least one rod member, and
at least one track member slot;
a spacer defining a spacer opening sized and dimensioned to receive the at least one rod member; and
a track ball; wherein
the at least one rod member of the support structure extends through the at least one support opening formed in the first and second track members and the spacer opening defined by the spacer to support the first and second track members at a desired location in space; and
the track ball is supported by the track member slots defined by the first and second track members for limited movement along a track path relative to the support structure.

12. A pet structure as recited in claim 11, in which the support structure further comprises an anchor connector, where the anchor connector is adapted to be secured relative to the support member and relative to the at least one rod member.

13. A pet structure as recited in claim 12, further comprising an anchor member, where the anchor connector engages the anchor member to secure the anchor connector relative to the support member.

14. A pet structure as recited in claim 11, in which the support structure comprises;

a plurality of anchor connectors; and
a plurality of the rod members; wherein
each anchor connector is adapted to be secured relative to the support member and to one of the plurality of rod members.

15. A pet structure as recited in claim 11, in which:
each of the first and second track members defines first and second support openings; and
the support structure comprises;
first and second anchor connectors; and
first and second rod members; wherein
the support member is adapted to be secured to the vertical mounting surface;
the first rod member is extended through the first support openings of the first and second track members;
the second rod member is extended through the second support openings of the first and second track members;
the first anchor member is adapted to be secured relative to the support member and to the first rod member; and
the second anchor member is adapted to be secured relative to the support member and to the second rod member.

16. A pet structure adapted to be supported by a horizontal surface, the pet structure comprising:
a support structure comprising
at least one platform member adapted to be supported by the horizontal surface, and
at least one rod member extending from the at least one platform member;
first and second track members adapted to be supported by the support structure, where each of the first and second track members defines
at least one support opening sized and dimensioned to receive the at least one rod member, and
at least one track member slot;
a spacer defining a spacer opening sized and dimensioned to receive the at least one rod member; and
a track ball; wherein
the at least one rod member of the support structure extends through the at least one support opening formed in the first and second track members and the spacer opening defined by the spacer to support the first and second track members at a desired location in space; and
the track ball is supported by the track member slots defined by the first and second track members for limited movement along a track path relative to the support structure.

17. A pet structure as recited in claim 16, in which the support structure comprises:
a plurality of platform members; and
at least one wall assembly adapted to be arranged between adjacent platform members, where each wall assembly defines a wall support opening sized and dimensioned to receive one of the plurality of rod members.

18. A pet structure as recited in claim 17, further comprising at least one spacer assembly adapted to be arranged between adjacent platform members, where each spacer assembly defines a spacer support opening sized and dimensioned to receive one of the plurality of rod members.

* * * * *